(12) United States Patent
Berman (10) Patent No.: US 7,570,240 B2
(45) Date of Patent: Aug. 4, 2009

(54) METHOD AND APPARATUS TO MINIMIZE LAMP FLICKER AND INCREASE CONTRAST RATIO IN PROJECTION DEVICES

(75) Inventor: Arthur Berman, San Jose, CA (US)

(73) Assignee: LightMaster Systems, Inc., Cupertino, CA (US)

( * ) Notice: Subject to any disclaimer, the term of this patent is extended or adjusted under 35 U.S.C. 154(b) by 706 days.

(21) Appl. No.: 11/213,153

(22) Filed: Aug. 25, 2005

(65) Prior Publication Data

US 2006/0139532 A1    Jun. 29, 2006

(51) Int. Cl.
*G09G 3/36* (2006.01)
(52) U.S. Cl. .............................. 345/87; 349/5; 353/122
(58) Field of Classification Search .................. 345/87, 345/102, 207; 349/5; 353/20, 37, 81, 82, 353/122; 359/20, 455, 634; 252/299.1, 582
See application file for complete search history.

(56) References Cited

U.S. PATENT DOCUMENTS 5,844,540 A * 12/1998 Terasaki ..................... 345/102
6,628,248 B2 * 9/2003 Masumoto et al. ............ 345/32
6,636,190 B2 * 10/2003 Hirakata et al. ............ 345/74.1
7,138,974 B2 * 11/2006 Hirakata et al. ............... 345/98
7,172,295 B2 * 2/2007 Engle ........................... 353/85
7,385,565 B2 * 6/2008 Okamori et al. ............... 345/32
2005/0117190 A1 * 6/2005 Iwauchi et al. .............. 359/237
2005/0219394 A1 * 10/2005 Du et al. ................. 348/333.12
2005/0248520 A1 * 11/2005 Feng et al. ..................... 345/87
2006/0055834 A1 * 3/2006 Tanitsu et al. .................. 349/5

* cited by examiner

*Primary Examiner*—Richard Hjerpe
*Assistant Examiner*—Tom V Sheng
(74) *Attorney, Agent, or Firm*—Martine Penilla & Gencarella, LLP (57) ABSTRACT

A variable retarder is inserted in a polarized light beam. The retardance of the variable retarder is increased when the light beam increases in brightness and is decreased when the light beam decreases in brightness. The amount of increase and/or decrease in retardance is calculated to stabilize the brightness of the light beam. The variable retarder may be used in conjunction with an auto-iris and share a same brightness detector.

16 Claims, 7 Drawing Sheets

Lamp Brightness

Adjustments to Input Light Level

Input Light Level

METHOD AND APPARATUS TO MINIMIZE LAMP FLICKER AND INCREASE CONTRAST RATIO IN PROJECTION DEVICES

Cross Reference to Related Applications and Claim of Priority

This invention claims priority to the following co-pending U.S. patent application, which is incorporated herein by references, in its entirety:

Berman, U.S. patent application Ser. No. 11/013,580, entitled "Method and Apparatus for Adjusting Light Intensity,".

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to projection devices and particularly to light sources and the preparation of light used in projection devices. The invention is yet more particularly related to projection devices using mercury short arc lamps as light sources for the projection devices.

2. Discussion of Background

Figure 1:
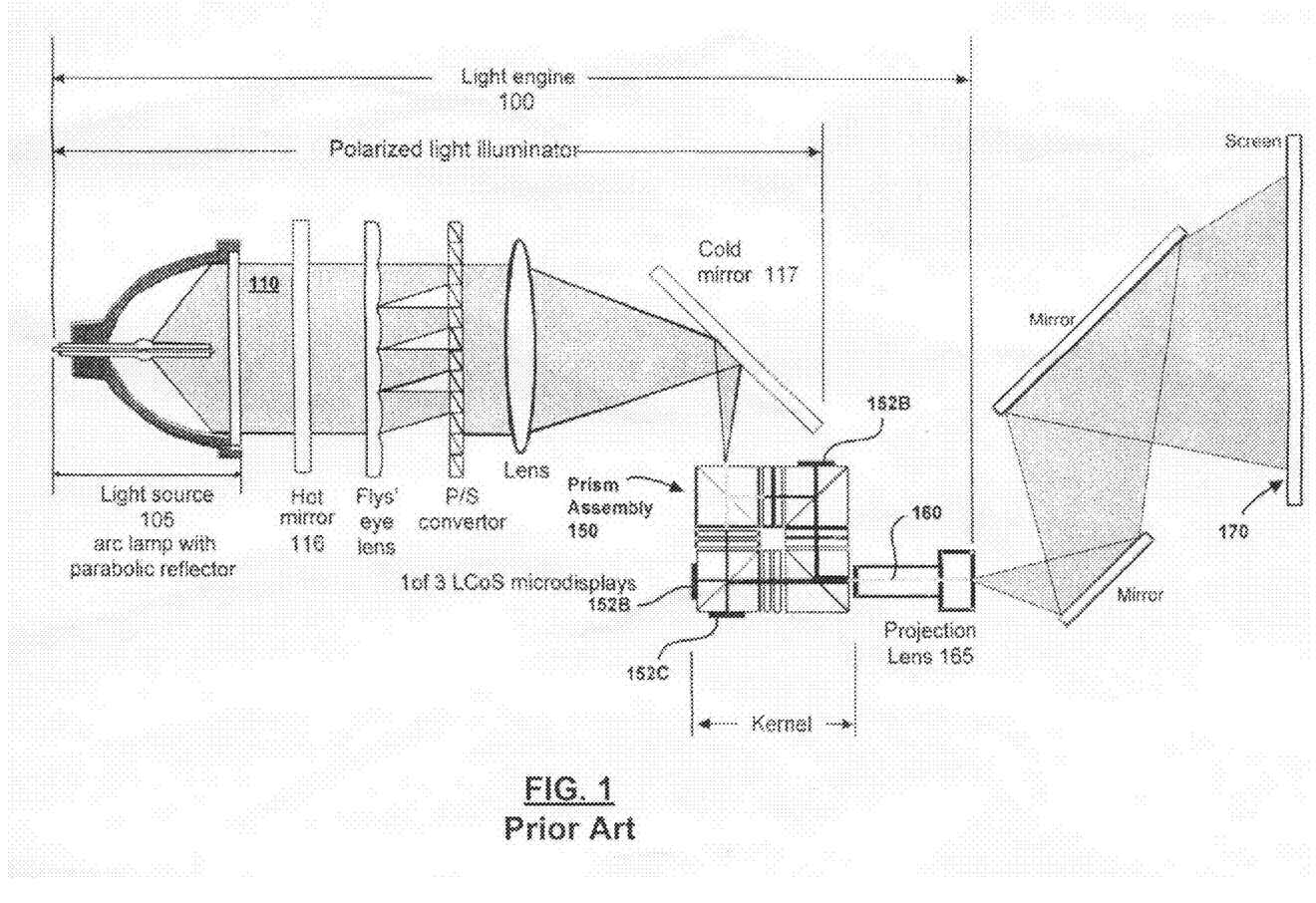
FIG. 1 is a drawing of a Liquid Crystal on Silicon (LCOS) based light engine.

The components of an LCOS based video projector 100 are explained by example of a light engine with reference to FIG. 1. As shown, white light 110 is generated by a light source 105. The light is collected, homogenized, polarized, and formed into the proper shape and otherwise processed by optics (not all shown for clarity). The light then enters a prism assembly 150 where it is broken into red, green and blue polarized light beams. A set of reflective microdisplays 152A, 152B, and 152C are provided and positioned to correspond to each of the polarized light beams (the prism assembly 150 with the attached microdisplays is called a kernel). The beams then follow different paths within the prism assembly 150 such that each beam is directed to a specific reflective microdisplay. The microdisplay that interacts with (reflects) the green beam modulates the green content of a full color video image. Similarly, the red and blue contents of the full color image are modulated by corresponding "red" and "blue" microdisplays. The prism assembly 150 then recombines the modulated beams into a modulated white light beam 160 that contains the full color video image. The resultant modulated white light beam 160 then exits the prism assembly 150 and enters a projection lens 165. Finally, the image-containing beam (white light beam 160 has been modulated and now contains the full color image) is projected onto a screen 170.

The light source 105 is, for example, a mercury short arc lamp. A mercury short arc lamp is the light source of choice in the vast majority of microdisplay based light engines of the type used in projection High Definition Television (HDTV). This includes light engines based on High Temperature Polysilicon (HTPS) microdisplays, Digital Light Processing (DLP) microdisplays and Liquid crystal on Silicon (LCOS) microdisplays. One unfavorable characteristic of the short arc lamp is that the light level tends to fluctuate. The light level variation can be of such a magnitude and frequency to be characterized as flicker. Flicker in the lamp is manifested as an unacceptable visible artifact in the projected video image. The predominant source of flicker can rightfully be attributed to instabilities in the arc.

Manufacturers of short arc lamps (such as Philips, the producer of the industry leading Ultra High Pressure (UHP) type lamp) have tried to minimize flicker. One technique is to pulse the current to the lamp. This technique is found to lessen the random component of the variation but, in itself, causes a predictable and periodic variation in light level. In practice, the periodic variation in light output is approximately canceled by synchronizing the lamp pulse to the drive of the microdisplay.

SUMMARY OF THE INVENTION

The present inventor has realized the need for improvements and alternatives for flicker suppression in light sources, and particularly for light sources for microdisplay video projectors. In one embodiment, the present invention provides a device, comprising, a driver device coupled to the sensor and the variable retarder and configured to drive the variable retarder to varying states of retardation based on a brightness sensed by the sensor. The sensor is, for example, a photo sensor. The device is, for example, disposed in at least one light path of a Liquid Crystal on Silicon (LCOS) High Definition (HD) Television or other projection device.

The above described variable retarder is, for example, disposed upstream of a linear polarizer in an input light path of a kernel of the video projection device. The kernel is, for example, a Liquid Crystal on Silicon (LCOS) based kernel. And, the variable retarder comprises, for example, a liquid crystal variable retarder including an inorganic alignment material with the alignment direction oriented relative to an axis of polarization of an input light.

In another embodiment, the present invention is a light stabilizer comprising a variable retarder set up to increase and decrease an amount of retardation exhibited by the variable retarder based on respective increases and decreases of a light source. The variable retarder comprises, for example, a liquid crystal material sandwiched between transparent substrates and having electrodes for applying an electric field to effect the increases and decreases in retardation.

In yet another embodiment, the present invention is a method, comprising the step of adjusting a brightness of an light beam based on and relative to a brightness of a lamp providing light for the input light beam and a brightness of a video image to be modulated into the light beam. The light beam is, for example, a linearly polarized light beam and the step of adjusting a brightness of the light beam comprises adjusting a retardance of a variable retarder upstream of a linear polarizer in the light beam. The step of adjusting the retardance comprises, for example, adjusting the retarder to decrease an amount of light in the light beam when the brightness level of a video image to be modulated into the light beam is below a predetermined threshold, and adjusting the retarder to decrease an amount of light input to the video projector system when a brightness level of the lamp exceeds a predetermined brightness level.

Portions of both the device and method may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable (s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
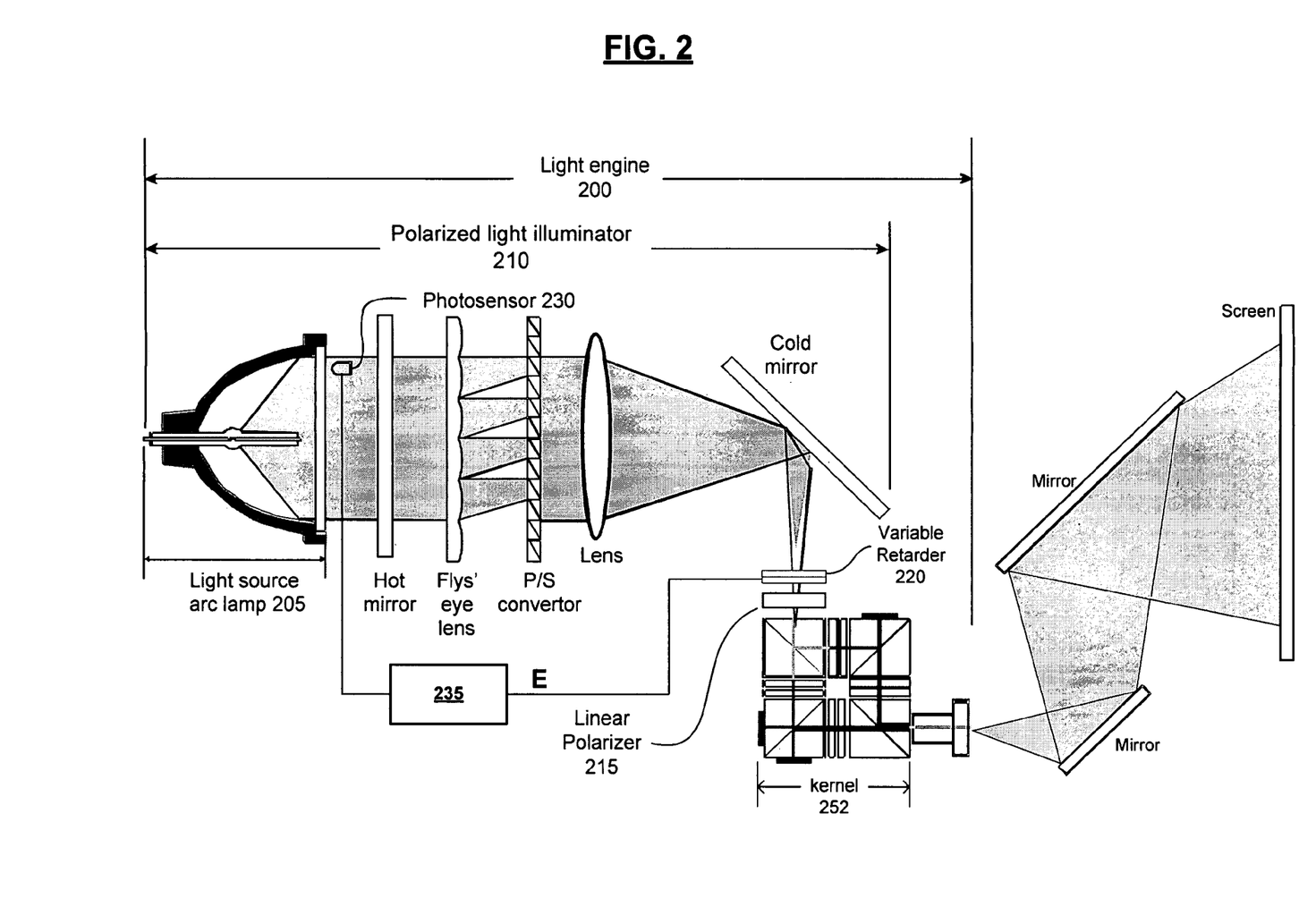
FIG. 2 is a drawing of a light engine 200 incorporating a variable retarder according to an embodiment of the present invention.

Referring now again to the drawings, wherein like reference numerals designate identical or corresponding parts, and more particularly to FIG. 2 thereof, there is illustrated a variable retarder according to an embodiment of the present invention. A light engine 200 includes an illuminator 210 that outputs light that is input to a kernel 252 a light for modulation.

Note that the light output by the illuminator 210 is S-polarized light. Also note that there is linear polarizer 215 positioned at an input to the kernel 252. The transmission axis of the linear polarizer 215 is parallel to the linear polarization of light output by the illuminator 210.

Although not strictly required, the linear polarizer 215 (e.g., a reflective linear polarizer) may be included in the design of a light engine without other portions of the invention. In such a case, the purpose of the linear polarizer 215 is to improve the extinction ratio of the light input to the kernel 252. If the linear polarizer is part of the light engine design then there will be little light loss associated with implementing the other portions of the invention in that same light engine. If the light engine design does not include a linear polarizer at an appropriate position, it is added, and doing so will introduce a small insertion loss. Thus, the present invention is efficiently added to existing light engine designs, particularly if the existing designs already incorporate an appropriately positioned polarizer.

As shown in FIG. 2, a variable retarder 220 is positioned at the input to the kernel 252 just optically upstream of the linear polarizer 215. The variable retarder 220 should be able to switch at least ½ lambda retardation to get a full range of adjustment capability. The axis of the retarder is oriented 45 degrees to the axes of linear polarization of both the light output by the illuminator 210 and that of the linear polarizer 215.

The variable retarder 220 is, for example, a type of liquid crystal device of which there are many possible and acceptable configurations. The preferred embodiment utilizes slightly tilted homeotropic alignment and a liquid crystal material with a negative dielectric anisotropy. The reason that this is the preferred embodiment is that slightly tilted vertical alignment can be accomplished with inorganic alignment materials, a type of alignment material that is stable in the high intensity light flux environment found at the kernel input. Note that the projection of the slight tilt bias is preferably oriented at an angle of 45 degrees to the previously described axes of linear polarization.

Such a variable retarder 220 will have essentially 0 lambda retardation in its unenergized state. In this state it will not effect the polarization of the input light which will go on to be transmitted through the linear polarizer with little attenuation. As the variable retarder is energized it will develop retardation and the polarization of the light input to the prism assembly linear polarizer 215 will be affected. When the variable retarder's retardation is >0 but <¼ lambda, the light will be elliptically polarized with the major axis along the S polarization direction. The component along the S direction will be transmitted by the linear polarizer. This portion will decrease from full transmission to half transmission as the variable retarder's retardation increases. When the variable retarder's retardation=¼ lambda the light will be circularly polarized and exactly half the light will be transmitted through the linear polarizer. When the polarization is >¼ lambda but <½ lambda the light will be elliptically polarized with its major axis along the P direction. As before, it is the component along the S direction that will be transmitted by the linear polarizer. This portion will decrease from half transmission to zero transmission as the retardation increases. When the retardation=½ lambda the light will again be linearly polarized but now in the P direction. Transmission through the linear polarizer will be 0.

Figure 3:
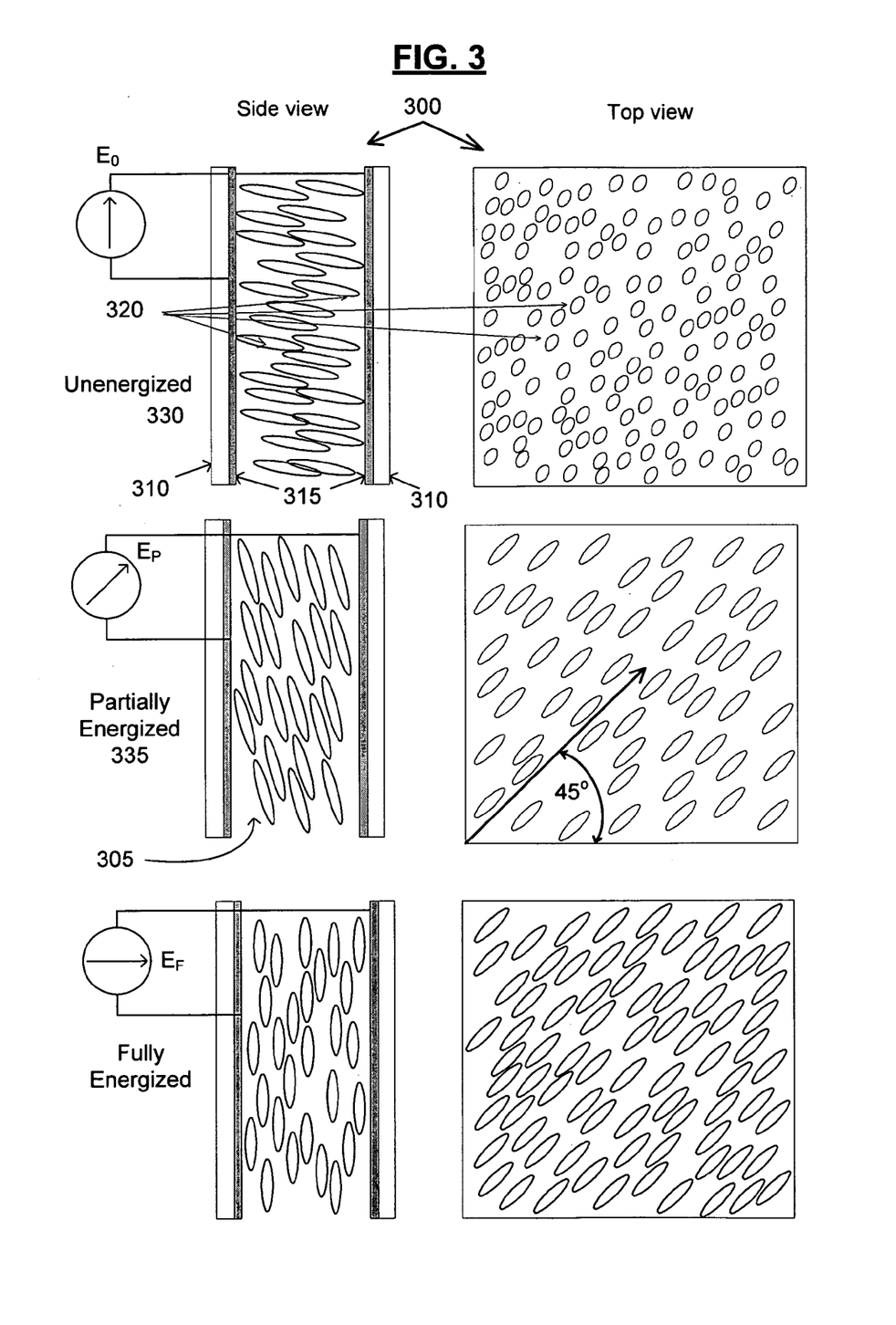
FIG. 3 is a drawing of an exemplary variable retarder according to an embodiment of the present invention.

FIG. 3 is a drawing of an exemplary variable retarder 300 according to an embodiment of the present invention. The variable retarder 300 is constructed using two transparent substrates 310 (e.g., glass), two transparent electrodes 315, and liquid crystal molecules 320 disposed between the substrates and electrodes. As shown in FIG. 3, in an unenergized state 330, the liquid crystal molecules, for example, have a slight tilt off vertical from the substrate. Energy source E represents a voltage applied to the electrodes of the variable retarder. The voltage applied to the electrodes creates an electric field that is applied to the liquid crystal molecules and causes the liquid crystal molecules to align at certain orientations depending on characteristics of the molecules and the applied electric field.

The unenergized state is shown as 330, E0, a no electric field is applied to the molecules, and the molecules align according to alignment layer forces acting on the molecules. The alignment forces orient the molecules at approximately 90 degrees to an axis of linear polarization of input light and of a linear polarizer used in the design.

A partially energized state (e.g., half energization) is illustrated at 335. The molecules have aligned according to their properties and the applied electric field E1. Half energization, for example, configures the variable retarder to provide approximately ¼ lambda retardation. A fully energized state is illustrated at 340. The molecules have aligned according to their properties and the applied electric field E2. Full energization, for example, configures the variable retarder to provide ½ lambda retardation.

Other possible configurations for the liquid crystal variable retarder include the twisted nematic, the surface mode with either 0 or pi and electrically controlled birefringence.

It should be noted that the linear polarizer and the variable retarder can be separate components included in the light engine. Other possibilities include that these components be combined and/or made part of the kernel. Their placements within the light engine and/or kernel may vary depending on design.

A light sensor (e.g. photosensor 230) is located, for example, somewhere in the illuminator or other light paths of the design. One possible location is illustrated in FIG. 2. The function of the lightsensor 230 is to detect the light level output by the lamp 205. Light level information is fed from the lightsensor 230 into a driver board 235. The driver board 235 acts to adjust the transmission of the variable retarder in real time so as to "level" the intensity of the light input to the kernel (e.g. remove any light level variation or flicker). The driver board includes, for example, electronics that convert a light level signal into an appropriate drive signal for the variable retarder 220. The drive signal is, for example, an Energization E that causes the variable retarder to adjust according to a predetermined plan to stabilize the brightness of light input to the kernel.

Figure 4:
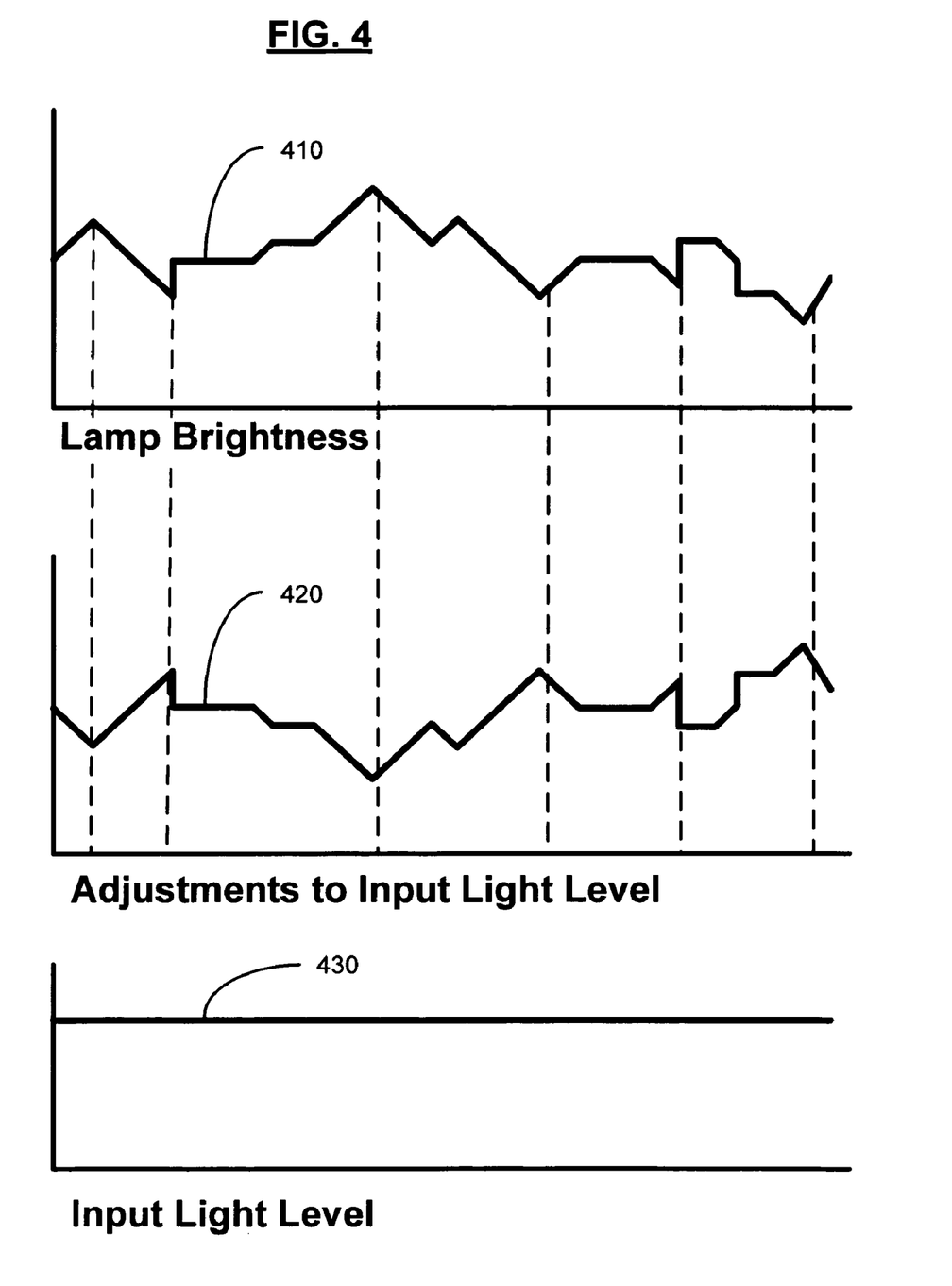
FIG. 4 is a graph of lamp brightness vs. relative adjustments to brightness and a resulting input light level according to an embodiment of the present invention.

For example, FIG. 4 is a graph of lamp brightness vs. relative adjustments to brightness and a resulting light level according to an embodiment of the present invention. As shown in FIG. 4, a theoretical lamp brightness 410 "flickers" randomly, the brightness level of the lamp having moments of higher intensity, moments of lower intensity, and moments of middle intensity. For each area of higher or lower brightness intensity corresponding compensatory adjustments 420 are illustrated. The compensatory adjustments 420 represent an amount of compensation needed to produce a stabilized, "level" input light level 430 that is input the kernel. The compensatory adjustments correspond to the amount of retardation to be implemented by the variable retarder and correspond to the signal E provided to the variable retarder to implement the stabilized input light level 430. The driver board 235 translated the signal from the photo sensor 235 to the signal E.

LightMaster Systems previously submitted a patent application for an auto iris. It was disclosed in Berman, U.S. patent application entitled "Method and Apparatus for Adjusting Light Intensity," filed Dec. 16, 2004, and assigned the contents of which are incorporated herein by reference in their entirety. A comparison of the above referenced application with the current disclosure shows that flicker suppression calls for optical components that are common with components that may be utilized in the auto iris. A consequence of this is that implementation of above described the flicker suppression is compatible with and will also allow implementation of the auto iris function. That is, the light level adjustment required for flicker suppression can be added to the transmission adjustment required for the auto iris function.

The "auto iris" is, for example, a device that reduces the intensity of light input to the kernel during times when a brightness of an image being modulated by the kernel is of lower intensity. One advantage of the "auto iris" is that by reducing the intensity of light input to the kernel during display of dark images allows the microdisplays on the kernel to be energized over a wider range. Another advantage is that dark portions can be made darker because the image is modulated using less light. Apparent contrast ratio of any of projectors, monitors, and televisions using the auto iris are therefore improved.

The auto iris works by monitoring the brightness of an image to be displayed. If the image is dark, the variable retarder is energized to decrease the illumination level so as to increase the contrast ratio and allow utilization of the full range of gray shades.

Figure 5:
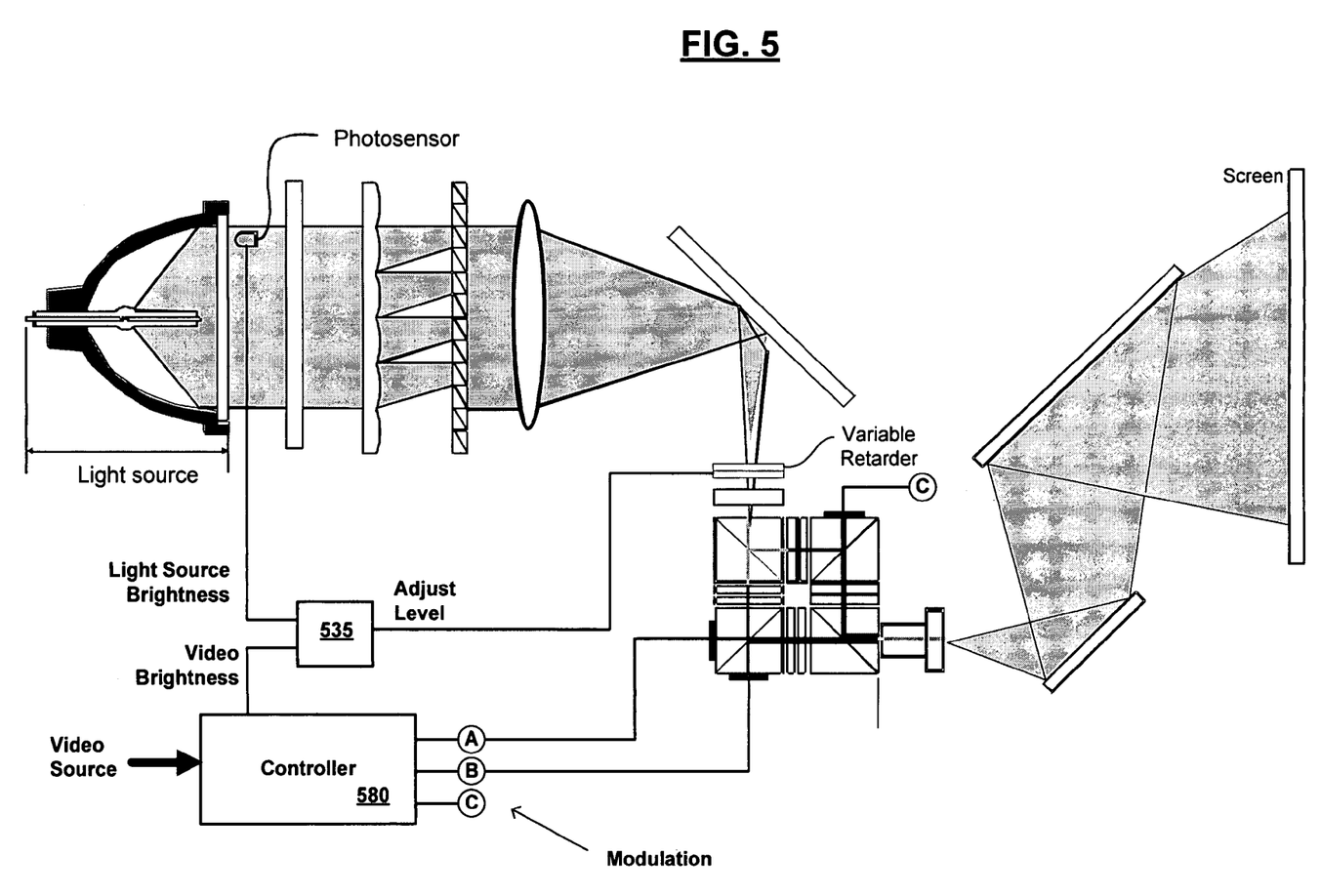
FIG. 5 is a drawing of a light engine having lamp brightness adjustments for both flicker control and contrast ratio improvements according to an embodiment of the present invention.

FIG. 5 is a drawing of a light engine having lamp brightness adjustments for both flicker control and contrast ratio improvements according to an embodiment of the present invention. A controller 580 receives a video input signal, or video source 585. The Controller 580 prepares separate content signals for each microdisplay of a kernel design (e.g., Red content, Green content, and Blue content). Each content signal is sent to a respective microdisplay positioned in a color light path corresponding to the color of the content signal provided to the microdisplay.

The controller also determines a video brightness of a displayed image. The controller includes, for example, an image brightness circuit that detects a brightness of the image to be displayed from the video source 585. In another embodiment (not shown) a brightness circuit reads modulation signals (e.g. modulation signals A, B or C) to determine the brightness of the displayed image. As illustrated, the video brightness is provided to a combined driver board 535. The combined driver board takes into account both the brightness of the displayed image and the light source brightness and determines an adjustment level (adjust level). The adjustment level is, for example, an amount of energization E to be provided to the variable retarder in order to implement both the auto iris described above, and the light source brightness leveling discussed further above.

Figure 6:
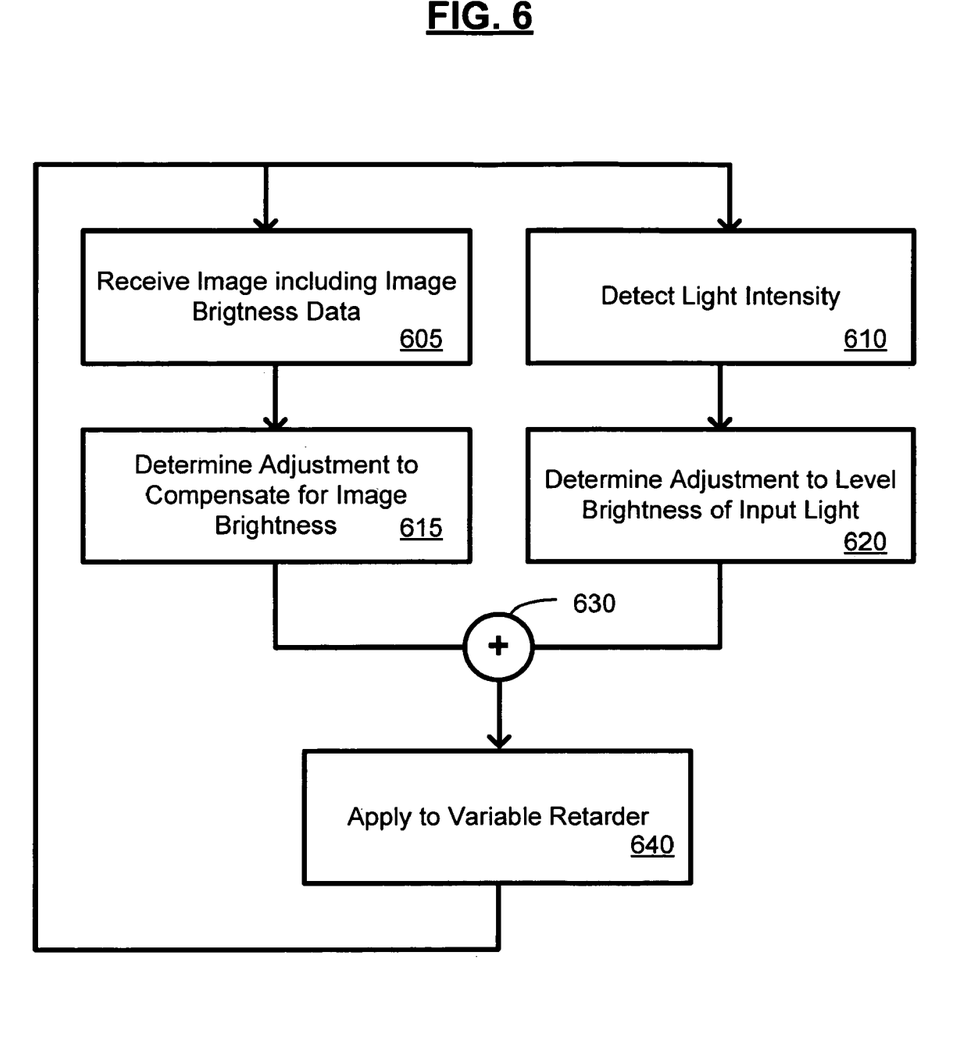
FIG. 6 is a flow diagram of a process for implementing both flicker control and contrast ratio improvements according to an embodiment of the present invention.

FIG. 6 is a flow diagram of a process for implementing both flicker control and contrast ratio improvements according to an embodiment of the present invention. The end result is the production of an amount of energization to be provided to the variable retarder to implement the improvements. Whether the functionality is implemented in a driver board, Video (or control) board is not particularly important. The process includes, for example, the receipt of image brightness (e.g., video brightness) data (step 605) and the detection of light intensity (or brightness) (step 610). Adjustments are determined for image brightness (step 615). The image brightness adjustments are, for example, similar to those discussed above with respect to the "auto iris." Adjustments are determined to compensate for light source brightness fluctuations (step 620). The amount of each adjustment will depend on the design and effectiveness of the variable retarder and other mechanisms (e.g., reflective polarizer) utilized to implement the desired compensations and adjustments. The compensation for light source brightness fluctuations and the image brightness adjustments are combined 630, and the combined compensations and adjustment are applied to the variable retarder (step 640).

Figure 7:
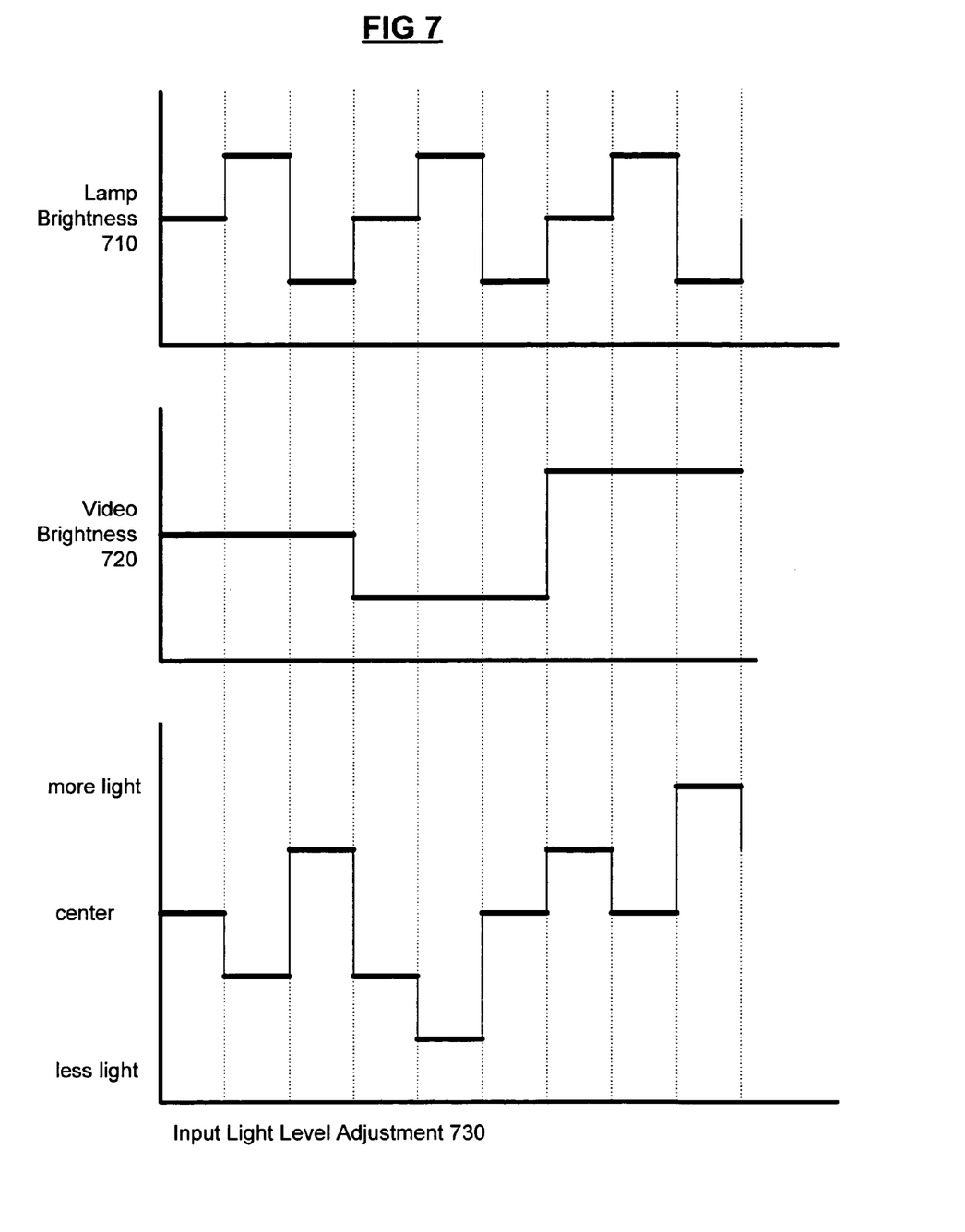
FIG. 7 is a graph illustrating the lamp brightness vs. video brightness and the relative adjustments to brightness according to an embodiment of the present invention.

FIG. 7 is a graph illustrating the lamp brightness vs. image brightness and the relative adjustments to brightness according to an embodiment of the present invention. A theoretical lamp brightness 710 is illustrated. The lamp brightness is theoretical because the flicker in lamps so illustrated would normally be a series of spikes. However, for the purposes of illustration, the lamp brightness is flattened and smoothed. The lamp brightness includes times of each of average brightness intensity, increased intensity, and lower intensity. A theoretical image (or video) brightness is 720 is also illustrated. Image brightness 720 includes times of each of average image brightness, decreased brightness, and increased brightness, which respectively correspond to the brightness of an average scene, a dark scene, and a bright scene. An amount of adjustment (Input Light Level Adjustment 730) is illustrated. The amount of adjustment illustrates the relative adjustment made for each of average, increased, and decreased lamp brightness in each of average, dark, and bright scenes of a displayed image or video. As can be seen in FIG. 7, the adjustment follows the video brightness (all other conditions being equal, brighter scenes get more light passed on to the kernel, darker scenes get less light passed on to the kernel) and inversely track the lamp brightness (all other conditions being equal, increased brightness of the lamp results in a lesser percentage of available light being passed on to the kernel, and decreased brightness of the lamp results in a greater percentage of available light being passed on to the kernel).

The discussion above was specifically tailored to address the requirements of a LCOS based light engine. The same may be adapted to the HTPS application. This is possible because both utilize polarized light illuminators. The technique can be applied to a DLP based light engine but may incur unsatisfactory insertion losses because the DLP light engine utilizes unpolarized light. Implementation of the approach discussed above is possible but requires polarizing the light produced by the DLP illuminator. We note, however, that mechanical iris systems have been developed for DLP based light engines. Such a system has no insertion loss. It is possible to apply the approach discussed in this disclosure to a DLP light engine with mechanical iris if the mechanical iris is fast enough. That is, the light sensor provides light level information to the mechanical iris driver. The logic is otherwise the same.

Although the present invention has been described herein with reference to certain kernel configurations and optical devices, the devices and processes of the present invention may be applied to many other kernel designs or configurations and may use a wide variety of optical devices.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing an iris or variable retarder, any other equivalent device, or other device having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to microdisplays, light sources, light engines, polarizers, projection lenses, driver boards, circuits, detectors, electronics, irises, variable retarders, etc. should also be consider in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, CDRW+/-, micro-drive, and magneto-optical disks, ROMS, RAMS, EPROMs, EEPROMS, DRAMs, VRAMs, flash memory devices (including flash cards, memory sticks), magnetic or optical cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/ specialized computer or microprocessor are software modules for implementing the teachings of the present invention, including, but not limited to, detecting light levels, adjusting a variable retarder, determining video brightness levels, combining adjustments, adjusting an auto iris, processing image data, and the display, storage, or communication of results according to the processes of the present invention.

The present invention may suitably comprise, consist of, or consist essentially of, any of element (the various parts or features of the present invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A device, comprising:
   a driver device coupled to a sensor and a variable retarder wherein the variable retarder comprises an inorganic alignment material with a tilted homeotropic alignment and a liquid crystal material with a negative dielectric anisotropy;
   wherein the device driver is configured to drive the variable retarder to varying states of retardation based on a brightness level of a lamp sensed by the sensor and a brightness level in a video image;
   wherein the retarder is configured to decrease an amount of light output by the lamp when the brightness level of the video image is dark;
   wherein the retarder is configured to decrease an amount of light output by the lamp when the brightness level of the lamp exceeds a predetermined brightness level; and
   wherein the variable retarder is disposed in an output light path of the lamp.

2. The device according to claim 1, wherein the sensor comprises a photo sensor.

3. The device according to claim 1, wherein the sensor and the variable retarder are disposed in at least one light path of a video projection device.

4. The device according to claim 3, wherein the video projection device comprises a Liquid Crystal on Silicon (LCOS) High Definition (HD) Television.

5. The device according to claim 3, wherein the variable retarder is disposed upstream of a linear polarizer in an input light path of a kernel of the video projection device.

6. The device according to claim 5, wherein the kernel is a Liquid Crystal on Silicon (LCOS) based kernel.

7. The device according to claim 1, wherein: the sensor comprises a video card comprising an image brightness circuit that detects brightness of an image.

8. The device according to claim 7, wherein the variable retarder is disposed upstream of a linear polarizer in a light path.

9. The device according to claim 1, wherein: the device driver is further configured to drive the variable retarder to varying states of retardation based simultaneously on both the brightness sensed by the sensor and a brightness of a video image.

10. The device according to claim 1, wherein the variable retarder comprises, a liquid crystal material sandwiched between transparent substrates and having electrodes for applying an electric field to effect the increases and decreases in retardation.

11. A device, comprising:
means for detecting a light level;
means for adjusting a retardance value based on the detected light level;
wherein the retardance value comprises an energization state of a liquid crystal retarder;
wherein the means for detecting a light level comprises means for detecting a brightness level of a lamp in a video projection system combined with means for detecting a brightness level in a video image;
the means for adjusting comprises,
    means to adjust the retarder to decrease an amount of light input to the video projection system when the brightness level of the video image is dark; and
    means to adjust the retarder to decrease an amount of light input to the video projector system when the brightness level of the lamp exceeds a predetermined brightness level wherein the retarder is upstream of a linear polarizer in an input light path of the projection system and the alignment material is aligned at an angle of approximately 45 degrees to an axis of linear polarization of the input light path.

12. The device according to claim 11, wherein the means for detecting a light level comprises a photo detector.

13. The device according to claim 11, wherein the means for detecting a light level comprises means for detecting a brightness level in a video image.

14. A device, comprising:
means for detecting a light level;
means for adjusting a retardance value based on the detected light level;
wherein the retardance value comprises an energization state of a liquid crystal retarder;
wherein the means for detecting a light level comprises means for detecting a brightness level of a lamp in a video projection system combined with means for detecting a brightness level in a video image;
the means for adjusting comprises,
    means to adjust the retarder to decrease an amount of light input to the video projection system when the brightness level of the video image is dark; and
    means to adjust the retarder to decrease an amount of light input to the video projector system when the brightness level of the lamp exceeds a predetermined brightness level, wherein the retarder comprises an inorganic alignment material with a tilted homeotropic alignment and a liquid crystal material with a negative dielectric anisotropy.

15. A method comprising:
adjusting a brightness of a light beam based on and relative to a brightness of a lamp providing light for the input light beam and a brightness of a video image to be modulated onto the light beam, wherein the light beam is a linearly polarized light beam and wherein adjusting the brightness of the light beam includes adjusting a retardance of a variable retarder upstream of a linear polarizer in the light beam; and
wherein adjusting the retardance of the variable retarder includes:
    adjusting the variable retarder to decrease an amount of light in the light beam when the brightness level of a video image to be modulated onto the light beam is below a predetermined threshold, and adjusting the variable retarder to decrease an amount of light input to the video projector system when a brightness level of the lamp exceeds a predetermined brightness level.

16. A device, comprising:
a driver device coupled to a sensor and a variable retarder;
wherein the device driver is configured to drive the variable retarder to varying states of retardation based on a brightness level of a lamp sensed by the sensor and a brightness level in a video image;
wherein the retarder is configured to decrease an amount of light output by the lamp when the brightness level of the video image is dark;
wherein the retarder is configured to decrease an amount of light output by the lamp when the brightness level of the lamp exceeds a predetermined brightness level; and
wherein the variable retarder is disposed in an output light path of the lamp wherein the variable retarder is upstream of a linear polarizer in an input light path of the projection system and the alignment material is aligned at an angle of approximately 45 degrees to an axis of linear polarization of the input light path.

* * * * *